United States Patent
Ting et al.

(10) Patent No.: US 6,602,590 B2
(45) Date of Patent: Aug. 5, 2003

(54) LIDDING FILM FOR MODIFIED ATMOSPHERE PACKAGING

(75) Inventors: Robert R. Ting, Plainsboro, NJ (US); Earl L. Hatley, Randolph, NJ (US); Jeffrey D. Moulton, Morristown, NJ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/851,281

(22) Filed: May 8, 2001

(65) Prior Publication Data

US 2002/0168489 A1 Nov. 14, 2002

(51) Int. Cl.⁷ .............................. B32B 1/08; B32B 3/10; B32B 27/00; B32B 27/08; B29D 22/00; B29D 23/00
(52) U.S. Cl. ...................... 428/218; 428/34.9; 428/35.2; 428/35.4; 428/36.7; 428/138; 428/500; 428/516; 428/476.1; 428/910; 428/913; 264/564; 264/176.1; 229/87.08; 229/97.01; 426/106; 426/125
(58) Field of Search ............................... 428/35.4, 516, 428/500, 910, 913, 218, 138, 35.2, 34.9, 36.7, 476.1; 229/87.08, 87.01; 426/125, 106; 264/564, 176.1

(56) References Cited

U.S. PATENT DOCUMENTS

| | | | | |
|---|---|---|---|---|
| 4,501,798 A | * | 2/1985 | Koschak et al. ............ | 428/349 |
| 5,053,259 A | * | 10/1991 | Vicik ......................... | 428/36.9 |
| 5,306,549 A | * | 4/1994 | Isozaki et al. ............... | 428/220 |
| 5,567,533 A | | 10/1996 | Toney et al. ............... | 428/475.5 |
| 5,753,373 A | * | 5/1998 | Scholz et al. ................ | 428/429 |
| 5,766,772 A | | 6/1998 | Cioca et al. ................. | 428/516 |
| 5,919,547 A | | 7/1999 | Kocher et al. .............. | 428/138 |
| 5,942,320 A | * | 8/1999 | Miyake et al. .............. | 428/216 |
| 5,948,490 A | * | 9/1999 | Raines et al. ............... | 428/35.2 |
| 5,985,386 A | * | 11/1999 | von Widdern et al. ..... | 428/34.8 |
| 6,606,136 | | 5/2000 | Patrick et al. ............. | 428/35.2 |
| 6,110,600 A | * | 8/2000 | Ramesh .................... | 428/476.9 |
| 6,203,867 B1 | * | 3/2001 | Derkach et al. ........... | 428/35.2 |
| 6,221,470 B1 | * | 4/2001 | Ciocca et al. ............... | 428/218 |
| 6,287,653 B1 | * | 9/2001 | Speer et al. ................ | 428/35.4 |
| 6,296,694 B1 | * | 10/2001 | Miller ......................... | 106/13 |

FOREIGN PATENT DOCUMENTS

| | | |
|---|---|---|
| DE | 198-35-745 | 2/2000 |
| EP | 0-801-096 | 10/1997 |
| JP | 06-000921 | 1/1994 |
| JP | 07-052334 | 2/1995 |
| WO | WO 95-33621 | 12/1995 |
| WO | WO 99-00250 | 1/1999 |

* cited by examiner

Primary Examiner—Harold Pyon
Assistant Examiner—Patricia L. Nordmeyer
(74) Attorney, Agent, or Firm—Roger H. Criss

(57) ABSTRACT

The invention relates to high gas barrier packaging films exhibiting good shrinkage and containing an antifog composition for modified atmosphere packaging of foods and the like. The films are useful for producing modified atmosphere packages that preserve and enhance the shelf life of food and non-food oxygen sensitive items. The films exhibit excellent shrinkage, permanent antifog, easy processing and low cost of manufacture.

37 Claims, No Drawings

LIDDING FILM FOR MODIFIED ATMOSPHERE PACKAGING

BACKGROUND OF THE INVENTION

1. Field of the Invention

The present invention relates to high gas barrier packaging films exhibiting good shrinkage and containing an antifog composition for packaging foods and the like. The films are useful for producing modified atmosphere packages that preserve and enhance the shelf life of food and non-food oxygen sensitive items.

2. Description of the Related Art

Containers have long been used to store perishable foods, such as meats, fruits and vegetables, prior to sale in the marketplace to consumers. Maximizing the time in which the food remains preserved in the containers minimizes the amount of spoilage.

The environment around which the food is preserved is an important factor in the preservation process. It is important that the food is maintained at an adequate temperature, while also controlling the molecular and chemical content of the gases surrounding the food. By providing an appropriate gas content to the environment surrounding the food, the food can be better preserved when maintained at the proper temperature or even when it is exposed to variations in temperature. This gives the food producer some assurance that the food will be in an acceptable condition when it reaches the consumer.

Preferred modified atmosphere packaging systems for foods, including raw meats, exposes these foods to extremely low levels of oxygen because it is well known that the freshness of meat can be preserved longer under anaerobic conditions than under aerobic conditions. Maintaining low levels of oxygen minimizes the growth and multiplication of aerobic bacteria.

Many multilayered films for modified atmosphere packaging systems are known. In this regard, U.S. Pat. No. 5,919,547 shows a laminate which delaminates into a substantially gas-impermeable portion and a gas-permeable portion. U.S. Pat. No. 6,060,136 teaches a multilayer film having first and second outer layers and an inner layer. The first and second outer layers comprise a homogeneous ethylene/alpha-olefin copolymer and the inner layer comprises a thermoplastic elastomer. This film is not taught to be heat shrinkable. U.S. Pat. No. 5,766,772 describes multilayer heat-shrinkable film endowed with anti-fog properties having a different structure from this invention.

It would be advantageous to provide a multilayered packaging film which is heat shrinkable, sealable to a food container and an effective gas barrier. It is also desirable that a film having these properties also have permanent anti-fog properties and are less expensive to manufacture than films of the prior art.

SUMMARY OF THE INVENTION

The invention provides a multilayered film which comprises a nylon film attached to a surface of a first polyethylene film via an intermediate adhesive layer, a surface of an ethylene vinyl alcohol film attached to another surface of the first polyethylene film, a surface of a second polyethylene film attached to another surface of the ethylene vinyl alcohol film, and an antifog composition on another surface of the second polyethylene film or incorporated into the second polyethylene film.

The invention also provides a process for producing a multilayered film which comprises coextruding an ethylene vinyl alcohol film to a surface of a first polyethylene film and coextruding a second polyethylene film to another surface of the ethylene vinyl alcohol film; either applying an antifog composition onto another surface of the second polyethylene film or incorporating an antifog composition into the second polyethylene film; and then either coextruding or laminating a nylon film onto another surface of the first polyethylene film via an intermediate adhesive layer.

The invention further provides a food package which comprises a container having an open portion and a multilayered film sealing the open portion; which multilayered film comprises a nylon film attached to a surface of a first polyethylene film via an intermediate adhesive layer, a surface of an ethylene vinyl alcohol film attached to another surface of the first polyethylene film, a surface of a second polyethylene film attached to another surface of the ethylene vinyl alcohol film, and an antifog composition on another surface of the second polyethylene film or incorporated into the second polyethylene film; the multilayered film being positioned such that the antifog composition is on the open portion.

The invention still further provides a multilayered film which comprises a nylon film attached to a surface of an oxygen barrier film, a polyethylene film attached to another surface of the oxygen barrier film via an adhesive layer, and an antifog composition on another surface of the polyethylene film or incorporated into the polyethylene film.

The present invention provides a multilayered packaging film which is heat shrinkable, sealable to a food container and an effective gas barrier. The film of this invention also has permanent anti-fog properties and is less expensive to manufacture than films of the prior art.

DETAILED DESCRIPTION OF THE PREFERRED EMBODIMENT

In the production of a multilayered film according to the invention, first an ethylene vinyl alcohol film is applied onto a surface of a first polyethylene film and a second polyethylene film is applied onto another surface of the ethylene vinyl alcohol film.

Ethylene vinyl alcohol compounds are well known in the art and readily commercially available. Copolymers of ethylene and vinyl alcohol suitable for use in the present invention can be prepared, for example, by the methods disclosed in U.S. Pat. Nos. 3,510,464; 3,560,461; 3,847,845; 3,595,740 and 3,585,177. The ethylene vinyl alcohol copolymer can be a hydrolyzed ethylene vinyl acetate copolymer. The degree of hydrolysis can range from about 85% to about 99.5%. The ethylene vinyl alcohol copolymer preferably contains from about 15 to about 65 mol percent ethylene and more preferably about 25 to about 50 mol percent ethylene. Copolymers of lower than 15 mol percent ethylene tend to be difficult to extrude while those above 65 mol percent ethylene have reduced oxygen barrier performance. The term "ethylene/vinyl alcohol copolymer" or "EVOH" is intended to comprise also the hydrolyzed or saponified ethylene/vinyl acetate copolymers and refers to a vinyl alcohol copolymer having an ethylene comonomer, which may be obtained, for example, by the hydrolysis of an ethylene/vinyl acetate copolymer or by chemical reaction of ethylene monomers with vinyl alcohol.

The first and second polyethylene films are preferably attached to the ethylene vinyl alcohol film by coextrusion, lamination, coating, sputtering or evaporation. Of these coextrusion is the most preferred. Non-limiting examples of suitable materials for the polyethylene films are low density polyethylene (LDPE), linear low density polyethylene (LLDPE), linear medium density polyethylene (LMDPE), linear very-low density polyethylene (VLDPE), linear ultra-low density polyethylene (ULDPE), high density polyethylene (HDPE). Of these, the most preferred is low density polyethylene.

An antifog composition is applied onto another surface of the second polyethylene film, preferably by coextrusion or by coating. In an alternate embodiment of the invention, an antifog composition is incorporated into the second polyethylene film rather than attaching a separate antifog layer. Non-limiting examples of antifog compositions are glycerol monoesters of a saturated or unsaturated fatty acid having from about 8 to about 20 carbon atoms, glycerol diesters of a saturated or unsaturated fatty acid having from about 8 to about 20 carbon atoms and ionic surfactants having phosphate, sulfate or quaternary amine functional end groups. Also suitable as antifog compositions are surfactants including anionic, cationic, nonionic and amphoteric surfactants. Suitable ionic surfactants have phosphate, sulfate or quaternary amine functional end groups. Other antifog compositions include sorbitan esters of aliphatic carboxylic acids, glycerol esters of aliphatic carboxylic acids, esters of other polyhydric alcohols with aliphatic carboxylic acids, polyoxyethylene compounds, such as the polyoxyethylene sorbitan esters of aliphatic carboxylic acids and polyoxyethylene ethers of higher aliphatic alcohols. Preferred antifog compositions are glycerol monooleate, glycerol monostearate and blends thereof. When the antifog composition is incorporated into the second polyethylene film, it is blended into the polyethylene film composition in an amount of from about 0.1 weight percent to about 5 weight percent. When the antifog composition is coated on the second polyethylene film it is preferably applied at a coating weight of from about 0.2 to about 0.6 g/m$^2$. Suitable antifog compositions are described, for example, in U.S. Pat. No. 5,766,772.

A layer of a nylon film is attached to the second polyethylene film via an intermediate adhesive layer or tie layer. The adhesive layer may be applied either directly onto the nylon film or onto the first polyethylene layer by any appropriate means in the art, such as by coating. Any suitable adhesive may be employed. Such adhesives include polyurethanes, epoxies, polyesters, acrylics, anhydride modified polyolefin and blends thereof. Modified polyolefin compositions have at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. The adhesive layer may also optionally comprise a colorant, an ultraviolet light absorber or both.

The nylon film is preferably attached to the first polyethylene film by lamination. Suitable nylons within the scope of the invention non-exclusively include homopolymers or copolymers selected from aliphatic polyamides and aliphatic/aromatic polyamides having a molecular weight of from about 10,000 to about 100,000. General procedures useful for the preparation of polyamides are well known to the art. Such include the reaction products of diacids with diamines. Useful diacids for making polyamides include dicarboxylic acids which are represented by the general formula

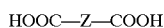

wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4-trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly (heptamethylene pimelamide) (nylon 7,7), poly (octamethylene suberamide) (nylon 8,8), poly (hexamethylene azelamide) (nylon 6,9), poly (nonamethylene azelamide) (nylon 9,9), poly (decamethylene azelamide) (nylon 10,9), poly (tetramethylenediamine-co-oxalic acid) (nylon 4,2), the polyamide of n-dodecanlanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here.

Of these polyamides, preferred polyamides include nylon 6, nylon 6,6, nylon 6/6,6 as well as mixtures of the same. Of these, nylon 6/6,6 is most preferred.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly (tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m- xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

Each of the first and second polyethylene films, nylon film, ethylene vinyl alcohol film, and adhesive layers may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the overall composition. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

As mentioned above, the first and second polyethylene films are preferably attached to the ethylene vinyl alcohol film by coextrusion. For example, the polymeric material for the individual layers, are fed into infeed hoppers of a like number of extruders, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017.

Alternatively the individual layers may first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically the polyethylene films, the ethylene vinyl alcohol film, the adhesive and nylon layers are positioned on one another, and the combination is passed through the nip of a pair of heated laminating rollers by techniques well known in the art. Lamination heating may be done at temperatures ranging from about 120° C. to about 175° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute.

Preferably the nylon film is oriented prior to being attached to the first polyethylene film. For the purposes of the present invention the term draw ratio is an indication of the increase in the dimension in the direction of draw. Preferably, in the present invention the film nylon film is drawn to a draw ratio of from 1.5:1 to 5:1 uniaxially in at least one direction, i.e. its longitudinal direction, its transverse direction or biaxially in each of its longitudinal and transverse directions. Preferably, the film is simultaneously biaxially oriented, for example orienting a plasticized film in both the machine and transverse directions at the same. This results in dramatic improvements in clarity strength and toughness properties. Preferably, the nylon film is biaxially oriented and is not heat set so that it is shrinkable both in its transverse and longitudinal directions.

Although each layer of the multilayer film structure may have a different thickness, the thickness of the nylon layer is from about 1 $\mu$m to about 25 $\mu$m, preferably from about 3 $\mu$m to about 8 $\mu$m, and more preferably from about 4 $\mu$m to about 6 $\mu$m. The thickness of the ethylene vinyl alcohol layer is from about 1 $\mu$m to about 25 $\mu$m, preferably from about 2 $\mu$m to about 8 $\mu$m and more preferably from about 3 $\mu$m to about 5 $\mu$m. The thickness of each of the first and second polyethylene films is from about 1 $\mu$m to about 50 $\mu$m, preferably from about 10 $\mu$m to about 30 $\mu$m, and more preferably from about 12 $\mu$m to about 25 $\mu$m. Further, if a separate antifog layer is included, the thickness of that antifog layer is from about 1 $\mu$m to about 25 $\mu$m, preferably from about 2 $\mu$m to about 8 $\mu$m and more preferably from about 3 $\mu$m to about 5 $\mu$m. While such thicknesses are preferred, it is to be understood that other film thicknesses may be produced to satisfy a particular need and yet fall within the scope of the present invention.

The oxygen transmission rate (OTR) of the multilayered film of the invention may be determined via the procedure of ASTM D-3985. In the preferred embodiment, the multilayered film according to this invention has an OTR of about 0.1 cc/100 in$^2$/day or less, preferably from about 0.085 cc/100 in$^2$/day or less and more preferably from about 0.07 cc/100 in$^2$/day or less at 65% relative humidity at 20° C.

The multilayered film of the invention is preferably heat shrinkable, generally by an amount of from about 2% to about 30%, more preferably from about 10% to about 20% in its length, or its width or each of its length and width. To provide a tightly adhering lid for a tray, for example, the film only need to exhibit shrinkage on the order of about 2 to about 3%. However, in order to have the film also form (unrestrained) about the side of the tray, higher shrinkage in the film is desirable. The multilayered film may further have printed indicia between the first polyethylene film and its attached nylon film. Since such printing is on an internal surface of the structure, it will not rub off when the surface is contacted. Optionally, the multilayered film may be uniaxially or biaxially oriented in a manner and in an amount indicated above for the nylon film and is not heat set so that it is shrinkable both in its transverse and longitudinal directions. In this case the nylon film may or may not have been oriented already.

The film preferably has a puncture resistance of at least about 1600 grams as measured by ASTM F 1306. Preferably the film has a haze of about 5% or less as measured by ASTM D1003.

The multilayered film is useful for forming a food package including a container, such as a tray, having an open portion and the multilayered film sealing the open portion. Such a structure is generally referred to a lidding film. The multilayered film is positioned such that the antifog composition is adjacent to the open portion, that is, facing the inside of the container. Such containers are suitable for packaging a variety of raw meats such as beef, pork, poultry, and veal, among others. A packaged food may comprises the food package and a food product such as a meat in the food package.

The container may have enclosed side walls, a floor and an top opening defining a central cavity wherein the open top optionally has a substantially flat peripheral rim. The multilayered film surrounds the container and is heat shrunk and heat sealed to it via the second polyethylene film such that the antifog composition is on the open portion (facing inward). The container may comprise a material such as cardboard, paperboard, boardstock, a plastic and combinations thereof. Preferred plastics include any one of several thermosetting or thermoplastic resins any of which are capable of sealing to the lidding material. Examples of materials include acrylonitrile, an acrylic polymer, polyethylene terephthalate (PET) or copolymers thereof, polyvinyl chloride, polycarbonate, polystyrene and polypropylene. In use the lidding film is positioned around the open portion and is caused to shrink, e.g. by the application of heat, a sufficient amount to seal the open portion of the container.

The invention further contemplates additional layers being attached to the multilayered film either before or after attaching the nylon layer, for example, first polyethylene/ adhesive/EVOH/adhesive/second polyethylene; or first polyethylene/adhesive/oxygen barrier/adhesive/second polyethylene. Further, the nylon layer may be attached to the first polyethylene film by coextrusion, lamination, or coating by extrusion coating of the nylon with or without an intermediate adhesive. It is also within the scope of the invention that any shrinkable film may be substituted for the nylon layer. Suitable shrinkable films other than nylons include polyesters, oriented polyolefins, and combinations thereof. Additionally, other suitable oxygen barrier films or coatings other than ethylene vinyl alcohol include polyvinyl alcohol, polyvinylidene chloride and combinations thereof.

It is also within the contemplation of the invention that the multilayered film comprises a nylon film attached to a surface of an oxygen barrier film, a polyethylene film attached to another surface of the oxygen barrier film via an adhesive layer, and an antifog composition on another surface of the polyethylene film or incorporated into the polyethylene film. As mentioned above, the oxygen barrier film may comprise a coating of ethylene vinyl alcohol, polyvinylidene chloride or combinations thereof.

The following non-limiting examples serve to illustrate the invention.

EXAMPLE 1

A film having the structure Substrate A/Adhesive/ Substrate B is produced wherein Substrate A is a 60 gauge (0.60 mil) shrinkable nylon 6/6,6 copolymer film having 20 to 25% shrinkage in both directions. The adhesive is a polyurethane based adhesive for indirect food contact coated at a weight of 1.0 to 1.5 lb/ream. Substrate B is a 5 layer coextrusion of Antifog PE/tie/EVOH/tie/PE, with EVOH at 25% of the total 1 mil film. The antifog additive is a glycerol monooleate (GMO). The antifog PE side of the coextrusion is the sealing side when the structure is heat sealed to a barrier tray. The total thickness of the film structure was 1.6–1.7 mils, and oxygen transmission rate was 0.008 cc $O_2$/100 in$^2$/day at 10° C., 80% RH.

EXAMPLE 2

A film having the structure Substrate A/Adhesive/ Substrate B is produced wherein Substrate A and Adhesive are as Example 1. Substrate B is a coextrusion of 5 layers: Antifog PE/tie/EVOH/tie/Antifog PE with EVOH at 25% of the total 1 mil film. The antifog additive is a glycerol monooleate (GMO). The total thickness of the film structure was 1.6–1.7 mils, and oxygen transmission rate was 0.008 cc $O_2$/100 in$^2$/day at 10° C. , 80% RH.

EXAMPLE 3

A film having the structure Substrate A/Adhesive/ Substrate B/Antifog Coating C is produced wherein Substrate A and Adhesive are as Example 1. Substrate B has 5 layers: PE/tie/EVOH/tie/PE without any compound loading of the antifog. The antifog coating is a glycerol monostearate (GMS) coated at a weight of 0.20–0.25 lb/ream. The total thickness of the film structure was 1.6–1.7 mils, and oxygen transmission rate was 0.008 cc $O_2$/100 in$^2$/day at 10° C., 80% RH. The light transmission was 93.2%, the haze level was 3.27 and the clarity was 95 .

EXAMPLE 4

A film having the structure Substrate A/EVOH coating/ Adhesive/Substrate B is produced wherein Substrate A is as Example 1. An EVOH coating is applied on the Substrate A with a coating weight of 1 to 2 lb/ream to provide an oxygen barrier. The adhesive is polyurethane or epoxy to bond the EVOH coating to the second substrate. Substrate B is a 1 mil coextrusion of PE/tie/EVOH/tie/Antifog PE with the EVOH layer below 18% of the total thickness. The total thickness of the film structure was 1.6–1.7 mils.

EXAMPLE 5

Films from Example 2 were used as lidding film to seal polyethylene trays with a meat patty inside. The heat seal conditions were 250° F. (121° C.) seal temperature and 350° F. (177° C.) knife temperature. The seal was good and there was no significant water condensation on the antifog coating.

EXAMPLE 6

Example 5 was repeated using films from Example 4 with polystyrene trays having a polyethylene sealant web, as well as polypropylene trays. The heat seal conditions were 330° F. (166° C.) seal temperature and 350° F. (177° C.) knife temperature. The seal was good and there was no significant water condensation on the antifog coating.

EXAMPLE 7

Example 5 was repeated using films made from Example 3 with polystyrene trays having a polyethylene sealing web. The heat seal conditions were 275–300° F. (135–149° C.) seal and 300° F. (149° C.) knife. There was no significant water condensation on the antifog coating after 72 hours.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A multilayered film which comprises a nylon film attached to a surface of a first polyethylene film via an intermediate adhesive layer, a surface of an ethylene vinyl alcohol film attached to another surface of the first polyethylene film, a surface of a second polyethylene film attached to another surface of the ethylene vinyl alcohol film, and an antifog composition on another surface of the second polyethylene film or incorporated into the second polyethylene film.

2. The multilayered film of claim 1 wherein the nylon film is biaxially oriented.

3. The multilayered film of claim 1 wherein the nylon is biaxially oriented from about 1.5 to about 5 times in either or each of its longitudinal and transverse directions.

4. The multilayered film of claim 1 which is heat shrinkable.

5. The multilayered film of claim 1 which has a length and a width and which is shrinkable by an amount of from about 2% to about 30% in its length, or its width or each of its length and width.

6. The multilayered film of claim 1 wherein the polyethylene films are attached to the ethylene vinyl alcohol film by coextrusion and the nylon film is attached to the first polyethylene film by lamination.

7. The multilayered film of claim 1 wherein the nylon film comprises nylon 6, nylon 66, nylon 6/6,6 or combinations thereof.

8. The multilayered film of claim 1 wherein the nylon film comprises nylon 6/6,6.

9. The multilayered film of claim 1 wherein the adhesive comprises a material selected from the group consisting of a polyurethane, an epoxy, a polyester, an acrylic, an anhydride modified polyolefin and blends thereof.

10. The multilayered film of claim 1 wherein the adhesive comprises a colorant, an ultraviolet light absorber or both.

11. The multilayered film of claim 1 wherein each of the first and second polyethylene films comprise a low density polyethylene.

12. The multilayered film of claim 1 wherein the ethylene vinyl alcohol film comprises an ethylene vinyl alcohol polymer having a degree of hydrolysis of from about 85 to about 99.5 percent and from about 15 to about 65 mol percent ethylene.

13. The multilayered film of claim 1 wherein the nylon film has a thickness of from about 1 $\mu$m to about 25 $\mu$m; wherein the ethylene vinyl alcohol film layer has a thickness of from about 1 $\mu$m to about 25 $\mu$m; and wherein each polyethylene film has a thickness of from about 1 $\mu$m to about 25 $\mu$m.

14. The multilayered film of claim 1 wherein the antifog composition comprises one or more materials selected from the group consisting of glycerol monoesters of a saturated or unsaturated fatty acid having from about 8 to about 20 carbon atoms, glycerol diesters of a saturated or unsaturated fatty acid having from about 8 to about 20 carbon atoms; and ionic surfactants having phosphate, sulfate or quaternary amine functional end groups.

15. The multilayered film of claim 1 wherein the antifog composition comprises one or more materials selected from the group consisting of anionic, cationic, nonionic and amphoteric surfactants.

16. The multilayered film of claim 1 wherein the antifog composition comprises glycerol monooleate, glycerol monostearate or a blend thereof.

17. The multilayered film of claim 1 wherein the antifog composition is coated on the second polyethylene film at a coating weight of from about 0.2 to about 0.6 g/m$^2$.

18. The multilayered film of claim 1 wherein the antifog composition is incorporated into the second polyethylene film.

19. The multilayered film of claim 1 further comprising printed indicia between the first polyethylene film and its attached nylon film.

20. The multilayered film of claim 1 which has an oxygen transmission rate of about 0.1 cc/100 in$^2$/day or less.

21. A process for producing a multilayered film which comprises coextruding an ethylene vinyl alcohol film to a surface of a first polyethylene film and coextruding a second polyethylene film to another surface of the ethylene vinyl alcohol film; either applying an antifog composition onto another surface of the second polyethylene film or incorporating an antifog composition into the second polyethylene film; and then either coextruding or laminating a nylon film onto another surface of the first polyethylene film via an intermediate adhesive layer.

22. The process of claim 21 wherein the antifog composition is applied onto the second polyethylene film.

23. The process of claim 21 wherein the antifog composition is incorporated onto the second polyethylene film.

24. The process of claim 21 wherein the nylon is biaxially oriented from about 1.5 to about 5 times in each of the longitudinal and transverse directions.

25. The process of claim 21 wherein the nylon film is attached to the first polyethylene film by lamination.

26. The process of claim 21 wherein the nylon film comprises nylon 6, nylon 66, nylon 6/6,6 or combinations thereof.

27. The process of claim 21 wherein the adhesive comprises a material selected from the group consisting of a polyurethane, an epoxy, a polyester, an acrylic, an anhydride modified polyolefin and blends thereof.

28. The process of claim 21 wherein the antifog composition comprises one or more materials selected from the group consisting of glycerol monoesters of a saturated or unsaturated fatty acid having from about 8 to about 20 carbon atoms, glycerol diesters of a saturated or unsaturated fatty acid having from about 8 to about 20 carbon atoms; and ionic surfactants having phosphate, sulfate or quaternary amine functional end groups.

29. The process of claim 21 wherein the antifog composition comprises one or more materials selected from the group consisting of anionic, cationic, nonionic and amphoteric surfactants.

30. The process of claim 21 wherein the antifog composition comprises glycerol monooleate, glycerol monostearate or a blend thereof.

31. The process of claim 21 wherein the antifog composition is coated on the second polyethylene film at a coating weight of from about 0.2 to about 0.6 g/m$^2$.

32. The process of claim 21 wherein each of the first and second polyethylene films comprise a low density polyethylene.

33. A food package which comprises a container having an open portion and a multilayered film sealing the open portion; which multilayered film comprises a nylon film attached to a surface of a first polyethylene film via an intermediate adhesive layer, a surface of an ethylene vinyl alcohol film attached to another surface of the first polyethylene film, a surface of a second polyethylene film attached to another surface of the ethylene vinyl alcohol film, and an antifog composition on another surface of the second polyethylene film or incorporated into the second polyethylene film; the multilayered film being positioned such that the antifog composition is on the open portion.

34. A packaged food which comprises the food package of claim 33 and a food product in the food package.

35. The packaged food of claim 34 wherein the food product comprises a meat.

36. A multilayered film which comprises a nylon film attached to a surface of an oxygen barrier film, a polyethylene film attached to another surface of the oxygen barrier film via an adhesive layer, and an antifog composition on another surface of the polyethylene film or incorporated into the polyethylene film.

37. The multilayered film of claim 36 wherein the oxygen barrier film comprises a coating of ethylene vinyl alcohol, polyvinylidene chloride or combinations thereof.

* * * * *